US008699182B2

(12) United States Patent
Aiello et al.

(10) Patent No.: US 8,699,182 B2
(45) Date of Patent: Apr. 15, 2014

(54) FLUID DYNAMIC MOTOR WITH REDUCED VIBRATIONS

(71) Applicants: Anthony Joseph Aiello, Santa Cruz, CA (US); Xiong Liu, Singapore (SG); Hans Leuthold, Santa Cruz, CA (US); Chuen Buan Lee, Singapore (SG); Choon Kiat Lim, Singapore (SG); Chris Michael Woldemar, Santa Cruz, CA (US)

(72) Inventors: Anthony Joseph Aiello, Santa Cruz, CA (US); Xiong Liu, Singapore (SG); Hans Leuthold, Santa Cruz, CA (US); Chuen Buan Lee, Singapore (SG); Choon Kiat Lim, Singapore (SG); Chris Michael Woldemar, Santa Cruz, CA (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/621,808

(22) Filed: Sep. 17, 2012

(65) Prior Publication Data
US 2014/0078616 A1    Mar. 20, 2014

(51) Int. Cl.
*G11B 17/02* (2006.01)

(52) U.S. Cl.
USPC ...................................... 360/99.12

(58) Field of Classification Search
USPC ................................. 360/99.12, 99.16, 99.08
See application file for complete search history.

(56) References Cited

U.S. PATENT DOCUMENTS

| 4,819,105 | A | | 4/1989 | Edwards | |
|---|---|---|---|---|---|
| 5,367,418 | A | * | 11/1994 | Chessman et al. | 360/99.12 |
| 6,201,661 | B1 | * | 3/2001 | Korkowski | 360/98.08 |
| 6,462,902 | B1 | * | 10/2002 | Luo et al. | 360/99.12 |
| 6,791,791 | B1 | | 9/2004 | Alfred et al. | |
| 6,888,698 | B1 | * | 5/2005 | Berding et al. | 360/98.08 |
| 7,310,200 | B2 | * | 12/2007 | Kovinskaya et al. | 360/98.08 |
| 8,116,076 | B2 | | 2/2012 | Cochrane | |
| 8,156,514 | B2 | | 4/2012 | Smirnov et al. | |
| 2004/0032690 | A1 | * | 2/2004 | Kovinskaya et al. | 360/98.08 |
| 2008/0037163 | A1 | | 2/2008 | Kohei et al. | |
| 2009/0244764 | A1 | | 10/2009 | Kotake et al. | |
| 2010/0202084 | A1 | * | 8/2010 | Watanabe et al. | 360/99.08 |
| 2010/0226046 | A1 | * | 9/2010 | Saito et al. | 360/245.2 |
| 2011/0116191 | A1 | | 5/2011 | Maeda et al. | |

* cited by examiner

*Primary Examiner* — Allen T Cao (57) ABSTRACT

An apparatus includes a hub, a first disk, a second disk, and a spacer. The hub is supported for relative rotation about a stationary component. The first disk is mounted to the hub with a first dynamic resonance mode associated therewith. The second disk is mounted to the hub with a second dynamic resonance mode associated therewith. The spacer is positioned between the first disk and the second disk, wherein the spacer is operable to cause the first dynamic resonance mode to be different from the second dynamic resonance mode.

7 Claims, 12 Drawing Sheets

FLUID DYNAMIC MOTOR WITH REDUCED VIBRATIONS

BACKGROUND

Disk drive capacity has been increasing by reducing the spacing between the tracks. Radial motion that does not follow a repeating pattern is known as a non-repetitive run out. A servo system needs to move the head instantaneously to stay on-track and avoid read/write errors even for non-repetitive run out.

Servo systems may tend to amplify relative radial motion between the head and data tracks at higher frequencies. This relative radial motion may be further amplified by air circulation within the drive, also known as windage. Windage may amplify the radial motion, and may be further increased in systems with more than one disk.

SUMMARY

An apparatus includes a hub, a first disk, a second disk, and a spacer. The hub is supported for relative rotation about a stationary component. The first disk is mounted to the hub with a first dynamic resonance mode associated therewith. The second disk is mounted to the hub with a second dynamic resonance mode associated therewith. The spacer is positioned between the first disk and the second disk, wherein the spacer is operable to cause the first dynamic resonance mode to be different from the second dynamic resonance mode.

BRIEF DESCRIPTION OF DRAWINGS

The present invention is illustrated by way of example, and not by way of limitation, in the figures of the accompanying drawings and in which like reference numerals refer to similar elements.

DETAILED DESCRIPTION

Reference will now be made in detail to embodiments, examples of which are illustrated in the accompanying drawings. While the embodiments will be described in conjunction with the drawings, it will be understood that they are not intended to limit the embodiments. On the contrary, the embodiments are intended to cover alternatives, modifications and equivalents. Furthermore, in the following detailed description, numerous specific details are set forth in order to provide a thorough understanding. However, it will be recognized by one of ordinary skill in the art that the embodiments may be practiced without these specific details. In other instances, well-known methods, procedures, components, and circuits have not been described in detail as not to unnecessarily obscure aspects of the embodiments.

Figure 1:
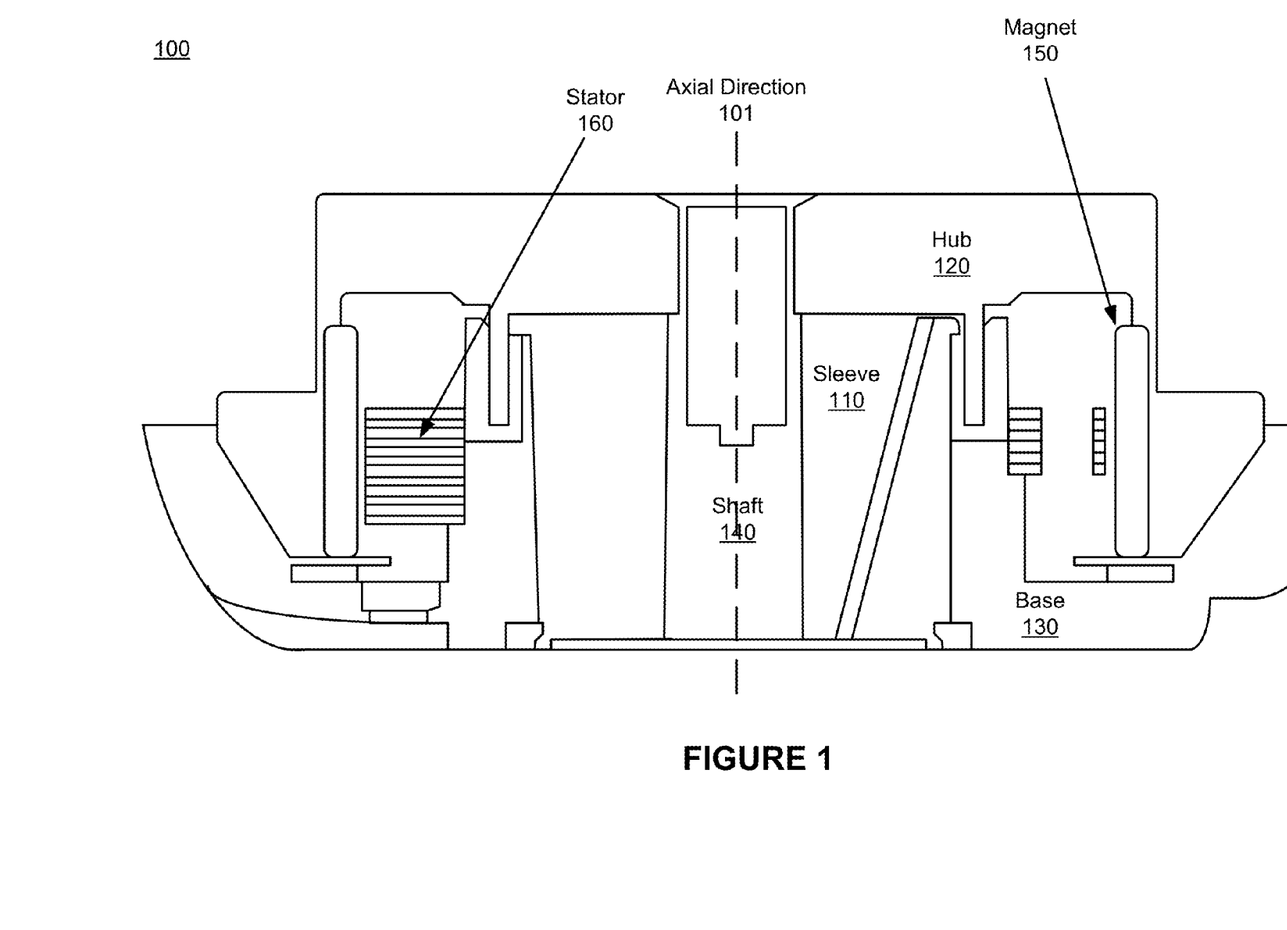
FIG. 1 shows a cross sectional view of a fluid dynamic motor in which embodiments of the present invention can be implemented.

For expository purposes, the terms "axially" or "axial direction" refer to a direction along a centerline axis length of a shaft, e.g., along centerline axis 101 of shaft 140 in FIG. 1, and "radially" or "radial direction" refer to a direction perpendicular to the centerline axis 101. The term "horizontal" as used herein refers to a plane parallel to the plane or surface of an object, regardless of its orientation. The term "vertical" refers to a direction perpendicular to the horizontal as just defined. Terms such as "above," "below," "bottom," "top," "side," "higher," "lower," "upper," "over," and "under" are referred to with respect to the horizontal plane.

Embodiments of the present invention provide methods and systems for reducing relative radial motion between the head and a given data track. Embodiments described herein are particularly effective at reducing relative radial motion at certain frequencies, e.g., 1000 Hz or higher, that do not follow a repeating pattern but are not limited thereto. For example, radial motion of the disk and data tracks caused by a phenomenon known as windage is reduced. Accordingly, amplitudes of disk modes are reduced, thereby enabling the track density to increase.

Several disk modes may get excited by windage pressure fluctuations acting on their surfaces. Lower order modes occurring at lower frequencies may result in larger motions that adversely impact the servo system's ability to track. Some disk modes may be referred to as 0,0 mode (also known as the umbrella mode) and 0,1 mode (also known as the tilting mode). In the umbrella mode, the disks become umbrella-shaped, for example due to windage, and in the tilting mode the disks on the opposite sides of the disk outer edge move in the axial direction out of phase with one another. In other words, in tilting mode the outer edges of the disks on each side move in opposite directions, which is modulated by the rotational speed and manifested in two vibration modes.

Referring now to FIG. 1, a cross sectional view of a fluid dynamic motor is shown, in which embodiments can be implemented. The fluid dynamic motor 100 includes a sleeve 110, a hub 120, a base 130, a shaft 140, magnets 150, and a stator 160. Axial direction 101 shows a centerline axis. Data storage disks (not shown) may be rotated at high speeds during operation using the magnets 150 and the stator 160. Magnets 150 may be mounted on the hub 120 and may interact with the stator 160 to cause rotation of the hub 120 relative to the stator 160. The magnets 150 may be magnetized to form two or more magnetic poles.

The fluid dynamic bearing motor 100 includes stationary component(s) as well as rotatable component(s) that define a fluid dynamic journal bearing and a thrust bearing therebetween. The rotatable component may include the hub portion 120 and the shaft 140 while the stationary component may include the sleeve 110. For example, the hub 120 and shaft 140 may be coupled with one another to form a single unitary piece, such that they rotate together about the centerline axis 101. Alternatively, the hub 120 and the shaft 140 may be originally formed from a single piece of material. The interface between the shaft 140 and the sleeve 110 may define the fluid dynamic journal bearing while the interface between the hub 120 and the sleeve 110 may define the thrust bearing.

It is appreciated that the rotatable component may be the sleeve 110 while the stationary components may include the hub 120 and the shaft 140. The sleeve 110, the hub 120, the shaft 140, the magnets 150, and the stator 160 are coupled to and housed in the base 130.

The disks are supported on a hub and their rotation is supported by the fluid dynamic bearing to dampen axial and tilting motions. In other words, the axial and tilting motions of disk modes may transfer energy to the supporting motor's fluid dynamic bearing. The axial and tilting motions may be exacerbated in systems with more than one disk, for example from windage pushing and pulling on the upper and lower surfaces of the disks at the same time. In order for dampening to occur, the axial and tilting motions of the individual disks should cause axial, radial, or tilting of the hub 120 and shaft 140 with respect to the sleeve 110. Accordingly, some of the kinetic energy is dissipated in the bearing and transformed into heat.

However, higher order disk vibration modes in multi-disk system may cancel each other out. The cancellation occurs if the vibration modes are substantially identical in frequency and amplitude but of opposite direction. In other words the cancellation causes substantially a net zero relative motion between hub and shaft with respect to sleeve. With substantially net zero relative motion, the bearing may not dampen the disks vibration modes. For example, trapped air between the disks undergoes pressure fluctuations and forces the disks to move in unison but in opposite directions. Accordingly, the deflection force couples within the hub and not through the fluid dynamic bearing as intended. Thus, the disk vibration resulting from the axial and tilting movements is not dampened. In other words, higher order disk vibration modes couple directly to the spindle hub, bypassing the fluid dynamic bearing, thereby increasing the likelihood of read/write errors.

Figure 2:
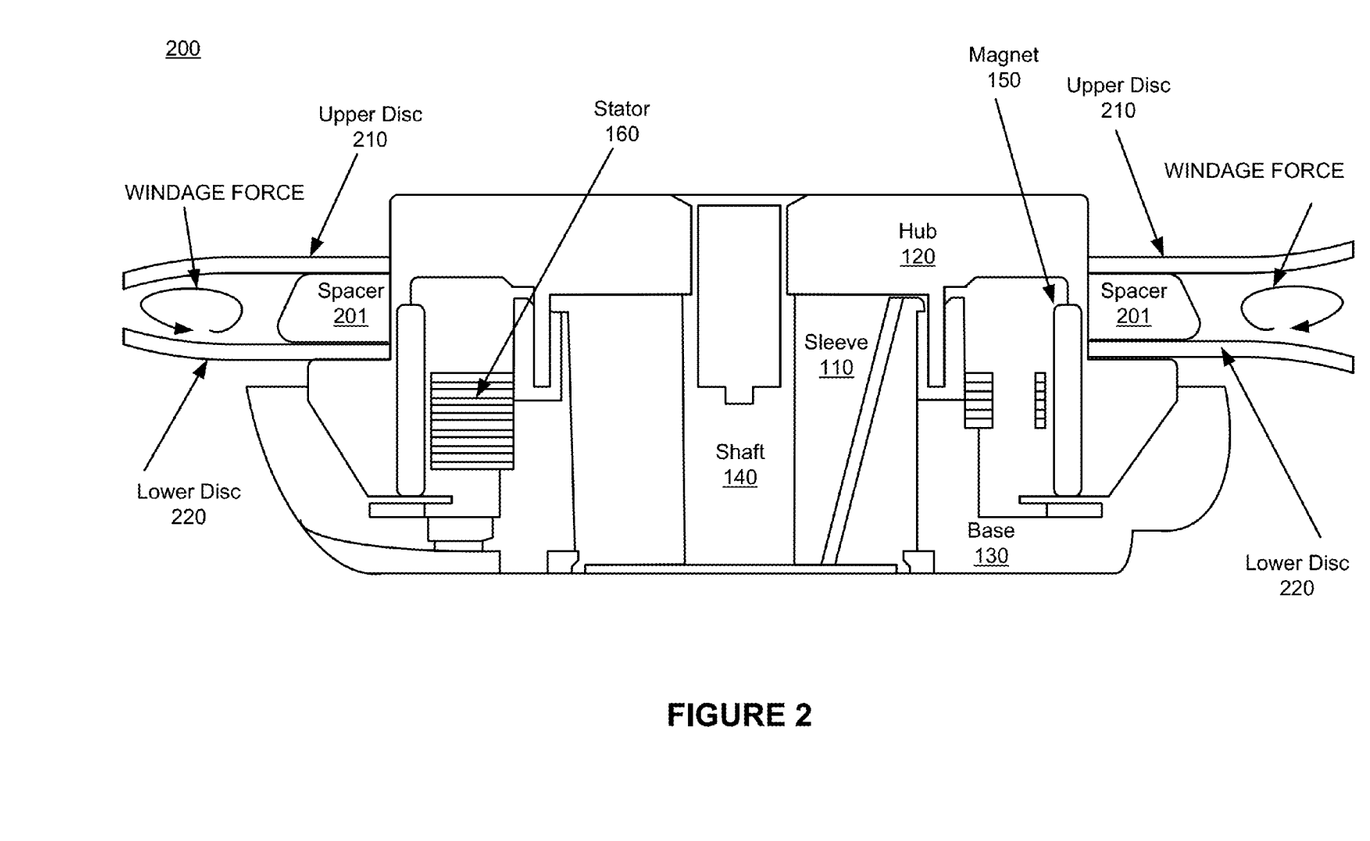
FIG. 2 shows the effect of windage on the disks coupled to the fluid dynamic motor with a spacer, in accordance with embodiments of the present invention.

Referring now to FIG. 2, effect of windage on the disks coupled to the fluid dynamic motor with a spacer is shown, in accordance with one embodiment. The fluid dynamic motor 100 may be coupled to an upper disk 210 and a lower disk 220. The fluid dynamic motor 100 may include a spacer ring 201 that is coupled to the upper disk 210 and the lower disk 220 and is further coupled to the hub 120. It is appreciated that showing of only an upper and a lower disk is for illustration purposes only and not intended to limit the scope. For example, three or more disks may be coupled to the fluid dynamic motor. In this example, a tilting mode is illustrated caused by the windage force. As described above, disk rotation at high frequencies, e.g., between 1000 Hz to 5000 Hz, may cause the upper disk 210 outer edges to move in opposite directions. Similarly, disk rotation at high frequencies may cause the lower disk 220 outer edges to move in opposite directions. It is noteworthy that the upper disk 210 and the lower disk 220 move in opposite directions of one another. As such, the fluid dynamic bearing is bypassed if unaddressed.

It is appreciated that at the umbrella mode, the upper disk 210 outer edges may move in the same direction, e.g., move up, while the lower disk 220 outer edges may move in the opposite direction of the upper disk 210 outer edges, hence move down in this instance. As such, at the umbrella mode the fluid dynamic bearing is also bypassed if unaddressed and may result in read/write errors.

Embodiments of the present invention implement a structure by which axial movement of disks in unison is reduced, thereby attenuating the disk resonances and dampening axial and tilting motions. Accordingly, disk densities may safely be increased without increasing read/write errors.

Figure 3:
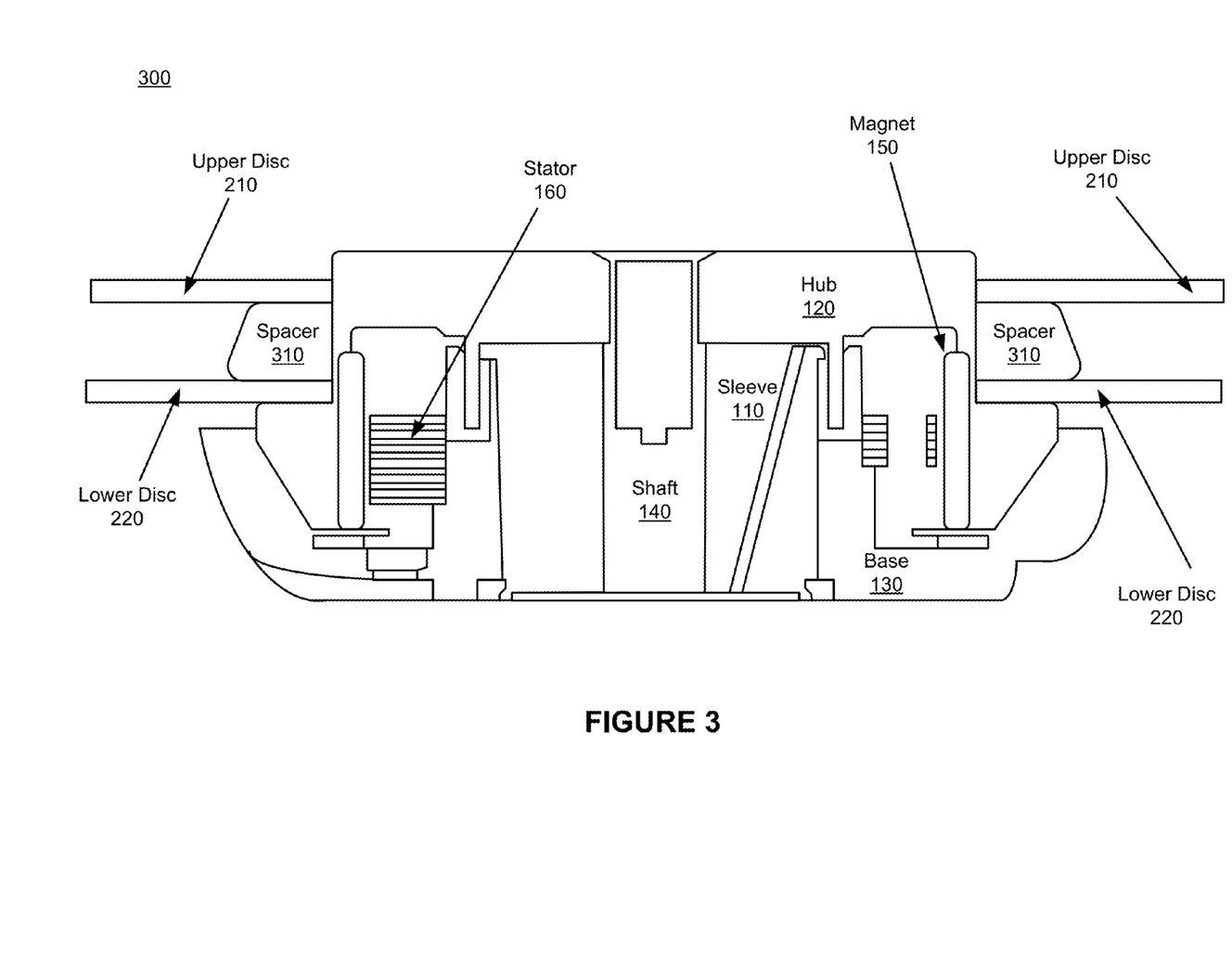
FIG. 3 shows a cross sectional view of a fluid dynamic motor with tapered ring spacer in accordance with one embodiment.

Referring now to FIG. 3, a cross sectional view of a fluid dynamic motor with tapered ring spacer in accordance with one embodiment is shown. It is appreciated that components that are the same and operate the same as those in the previous figures are numbered with the same element number and their description is not duplicated at each subsequent figure.

The fluid dynamic motor 300 according to one embodiment includes a spacer ring 310. The spacer ring 310 is tapered and couples to the hub 120. The spacer ring 310 is also connected to the upper disk 210 and the lower disk 220. Having a tapered ring 310 causes the upper disk 210 and the lower disk 220 to deflect at different radia resulting in disk vibration modes that are different. Therefore, windage excitation may move the upper and the lower disks independently and not in unison. Accordingly, energy from tilting or axial motions may be dissipated in the motor's fluid dynamic bearing, resulting in dampening, because the tilting or axial motions by the upper 210 and lower disks 220 do not cancel each other out.

In other words, having a tapered spacer ring 310 changes the boundary conditions of the upper disk 210 and the lower disk 220, thereby shifting the natural frequencies of the upper 210 and lower disk 220 apart such that they vibrate out of phase. As such, tilting and/or axial motions of the upper disk 210 and the lower disk 220, whether due to windage or some other force, do not occur in unison. In other words, shaping the spacer ring 310 such that the outer edge contacts the upper disk 210 at a different location in comparison to the lower disk 220 effectively changes the diameter of the upper 210 and the lower disk 220, thereby reducing their tendency to move in opposite directions at the same time.

Figure 4:
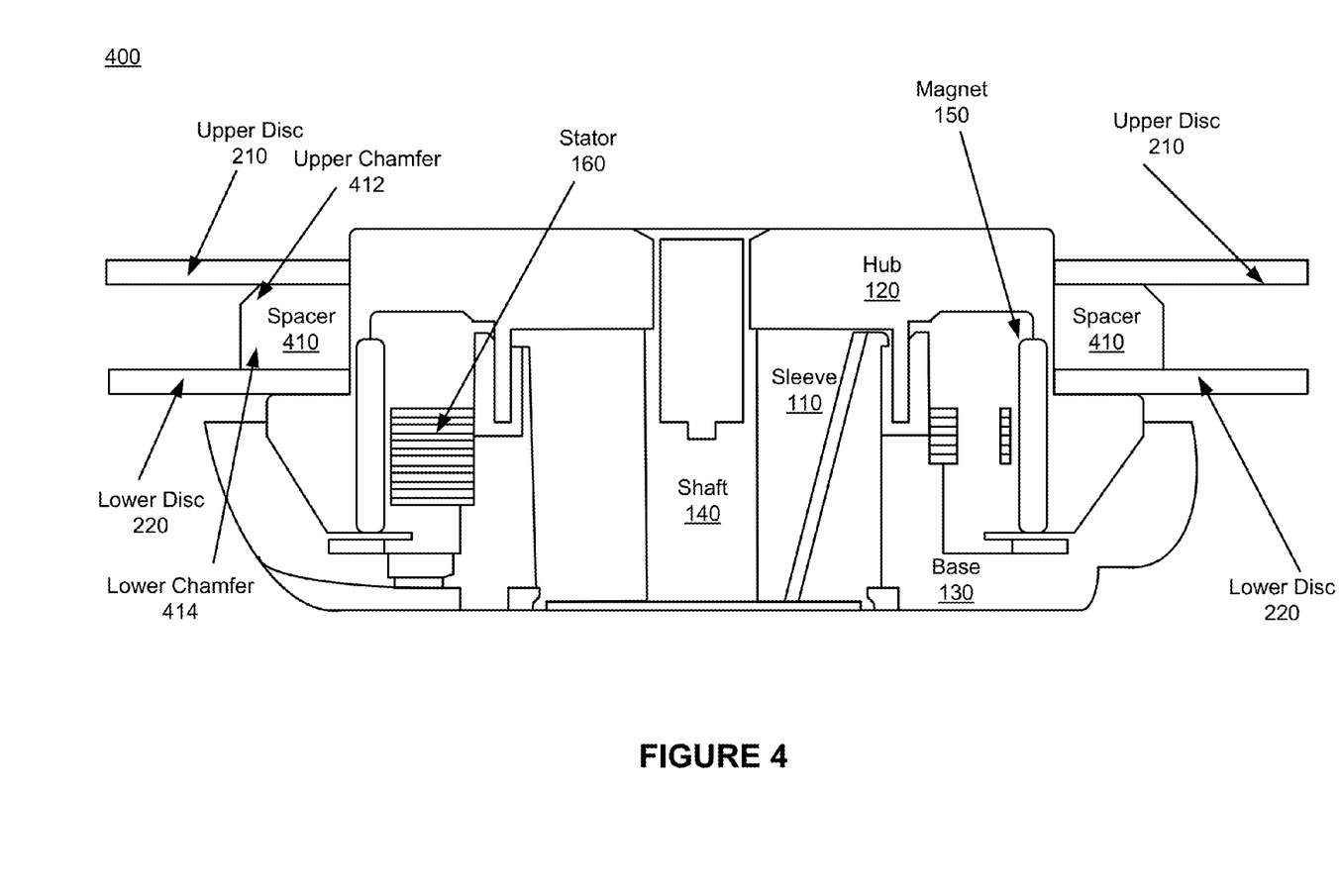
FIG. 4 shows a cross sectional view of a fluid dynamic motor with different spacer chamfers in accordance with one embodiment.

Referring now to FIG. 4, a cross sectional view of a fluid dynamic motor with different spacer chamfers in accordance with one embodiment is shown. The fluid dynamic motor 400 includes a spacer ring 410. The spacer ring 410 is coupled to the hub 120 and further connected to the upper 210 and the lower disk 220. The spacer ring 410 has an upper chamfer 412 that is sized differently than the lower chamfer 414. Having a spacer ring 410 with its chamfers sized differently causes the upper disk 210 and the lower disk 220 to deflect independently and not in unison. Accordingly, energy from tilting or axial motions are transferred to the motor's fluid dynamic bearing because the tilting or axial motions by the upper 210 and lower disks 220 do not cancel each other.

Accordingly, having different spacer chamfers for a spacer ring 410 changes the boundary conditions of the upper disk 210 and the lower disk 220, thereby shifting the natural frequencies of the upper 210 and lower disk 220 apart such that they vibrate out of phase. As such, tilting and/or axial motions of the upper disk 210 and the lower disk 220, whether due to windage or other influence, do not occur in unison. In other words, shaping the spacer ring such that the outer edge contacts the upper disk 210 at a different location in comparison to the lower disk 220 effectively changes the diameter of the upper 210 and the lower disk 220, thereby reducing their tendency to uniformly move in opposite directions.

Figure 5:
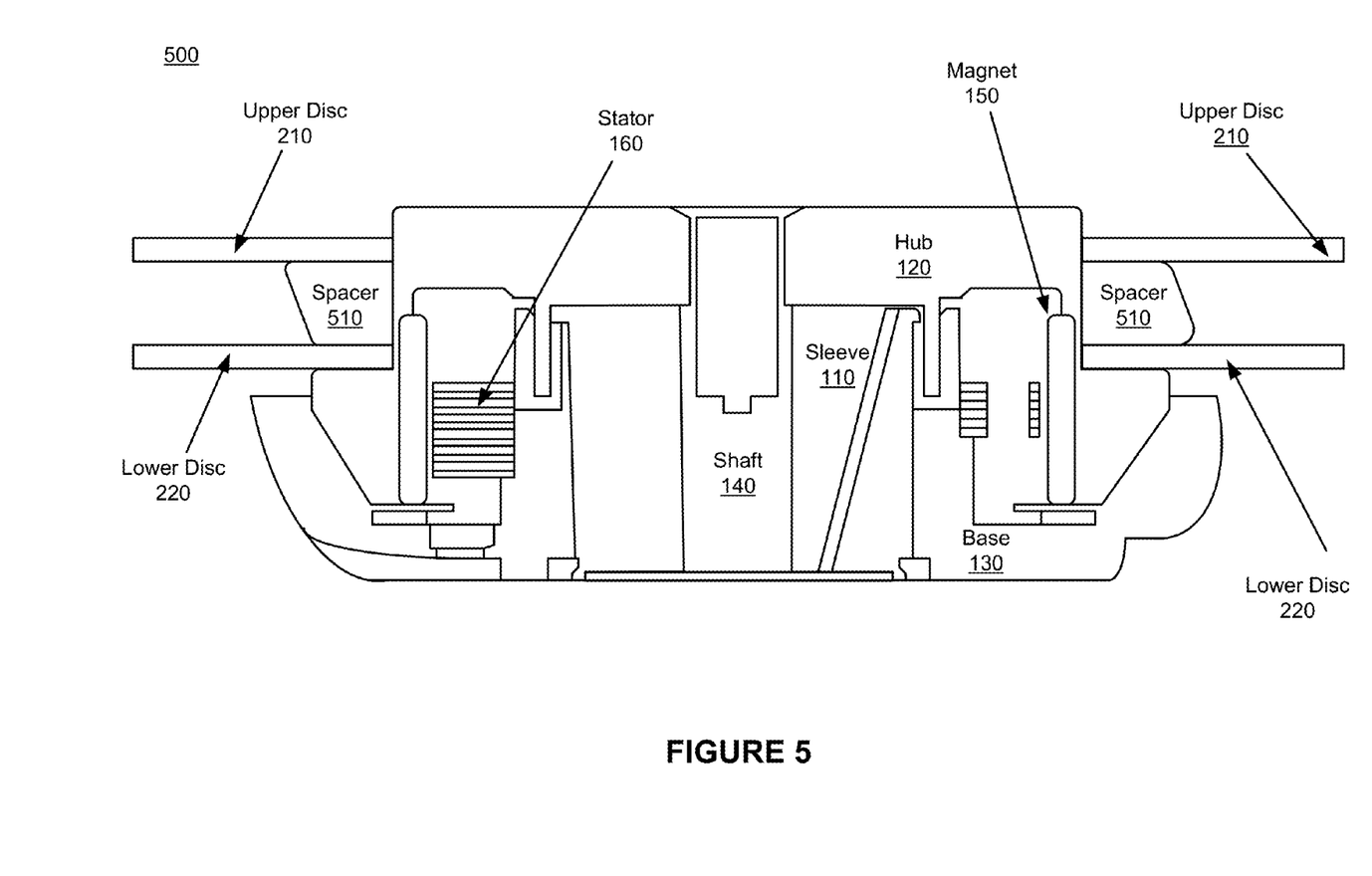
FIG. 5 shows a cross sectional view of a fluid dynamic motor with a lobed ring spacer in accordance with one embodiment.

Referring now to FIG. 5, a cross sectional view of a fluid dynamic motor with a lobed ring spacer in accordance with one embodiment is shown. The fluid dynamic motor 500 includes a spacer ring 510. The spacer ring 510 is coupled to the hub 120 and further connected to the upper 210 and the lower disk 220. The spacer ring 510 is lobed. Having a lobed spacer ring 510 causes the upper disk 210 and the lower disk 220 to deflect independently and not in unison. Accordingly, energy from tilting and/or axial motions are transferred to the motor's fluid dynamic bearing because the tilting and/or axial motions by the upper 210 and lower disks 220 do not cancel each other.

In other words, the lobed spacer ring 510 changes the boundary conditions of the upper disk 210 and the lower disk 220, thereby shifting the natural frequencies of the upper 210 and lower disk 220 apart such that they vibrate out of phase. As such, tilting and/or axial motions of the upper disk 210 and the lower disk 220, whether due to windage or not, do not occur in unison. The lobed spacer ring 510 contacts the upper disk 210 at a different location in comparison to the lower disk 220 and effectively changes the diameter of the upper 210 and the lower disk 220, thereby reducing their tendency to move in opposite directions in unison.

It is appreciated that the spacer ring may have any shape as long as the spacer contacts the upper disk at a different location in comparison to the lower disk. For example, referring now to FIG. 6, a cross sectional view of a fluid dynamic motor with a knee shaped ring spacer in accordance with one embodiment is shown. The fluid dynamic motor 600 may include a spacer ring 610. The spacer ring 610 is coupled to the hub 120 and is further coupled to the upper disk 210 and the lower disk 220. The spacer ring 610 may be knee shaped such that it contacts the upper disk 210 at a different location in comparison to the lower disk 220. Having a knee shaped spacer ring 610 causes the upper disk 210 and the lower disk 220 to deflect independently and not in unison. Accordingly, energy from tilting and/or axial motions are transferred to the motor's fluid dynamic bearing because the tilting and/or axial motions by the upper 210 and lower disks 220 do not cancel each other.

Figure 6:
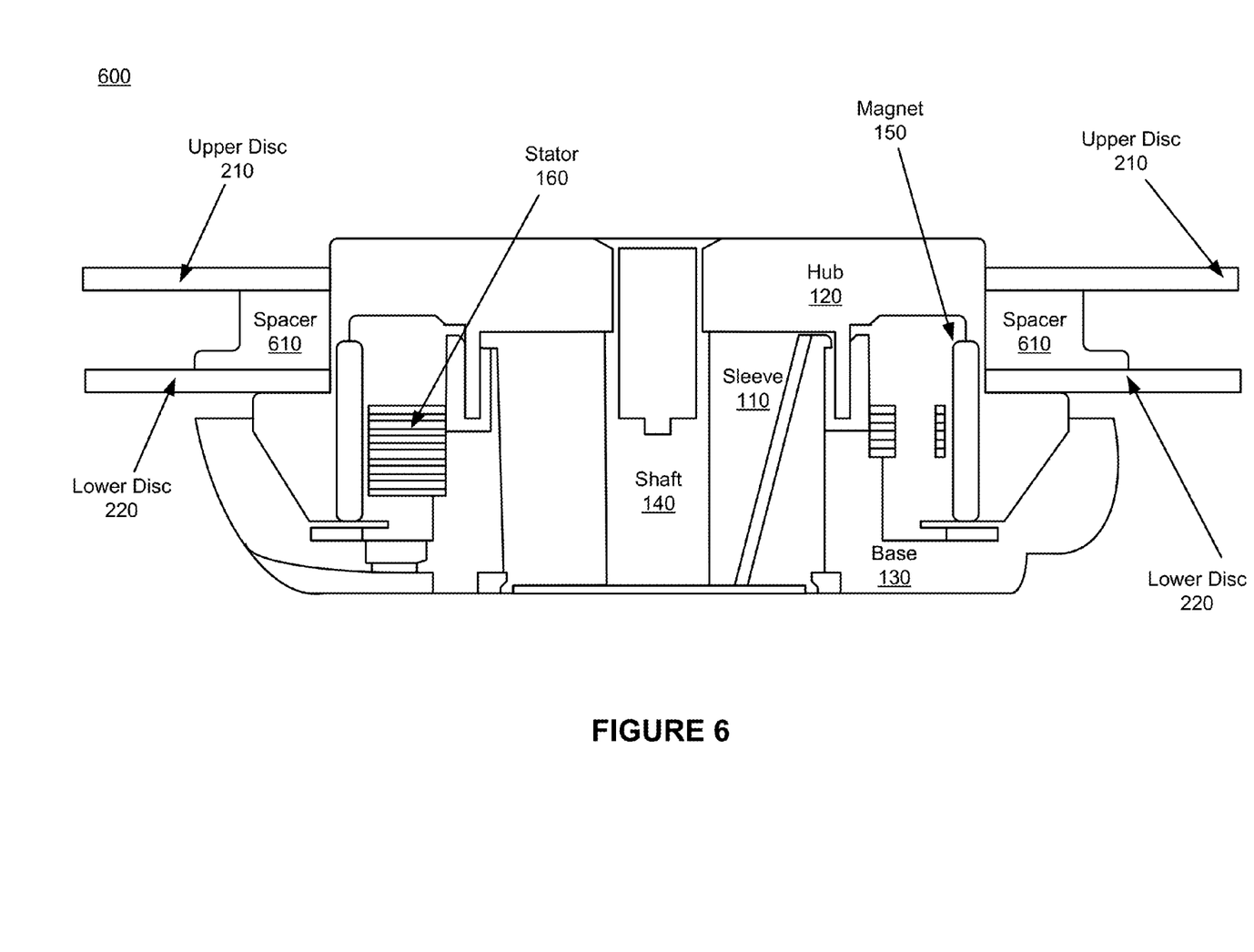
FIG. 6 shows a cross sectional view of a fluid dynamic motor with a knee shaped ring spacer in accordance with one embodiment.

In other words, the knee shaped spacer ring 610 changes the boundary conditions of the upper disk 210 and the lower disk 220, thereby shifting the natural frequencies of the upper 210 and lower disk 220 apart such that they vibrate out of phase. As such, tilting and/or axial motions of the upper disk 210 and the lower disk 220, whether due to windage or not, do not occur in unison. The knee shaped spacer ring 610 contacts the upper disk 210 at a different location in comparison to the lower disk 220 and effectively changes the diameter of the upper 210 and the lower disk 220, thereby reducing their tendency to move in opposite directions in unison.

It is appreciated that the spacer ring shapes described herein are exemplary and not intended to limit the scope of the embodiments. For example, the upper portion of the ring spacer may have a non-uniform diameter and the lower portion of the ring spacer may have a uniform diameter.

Figure 7:
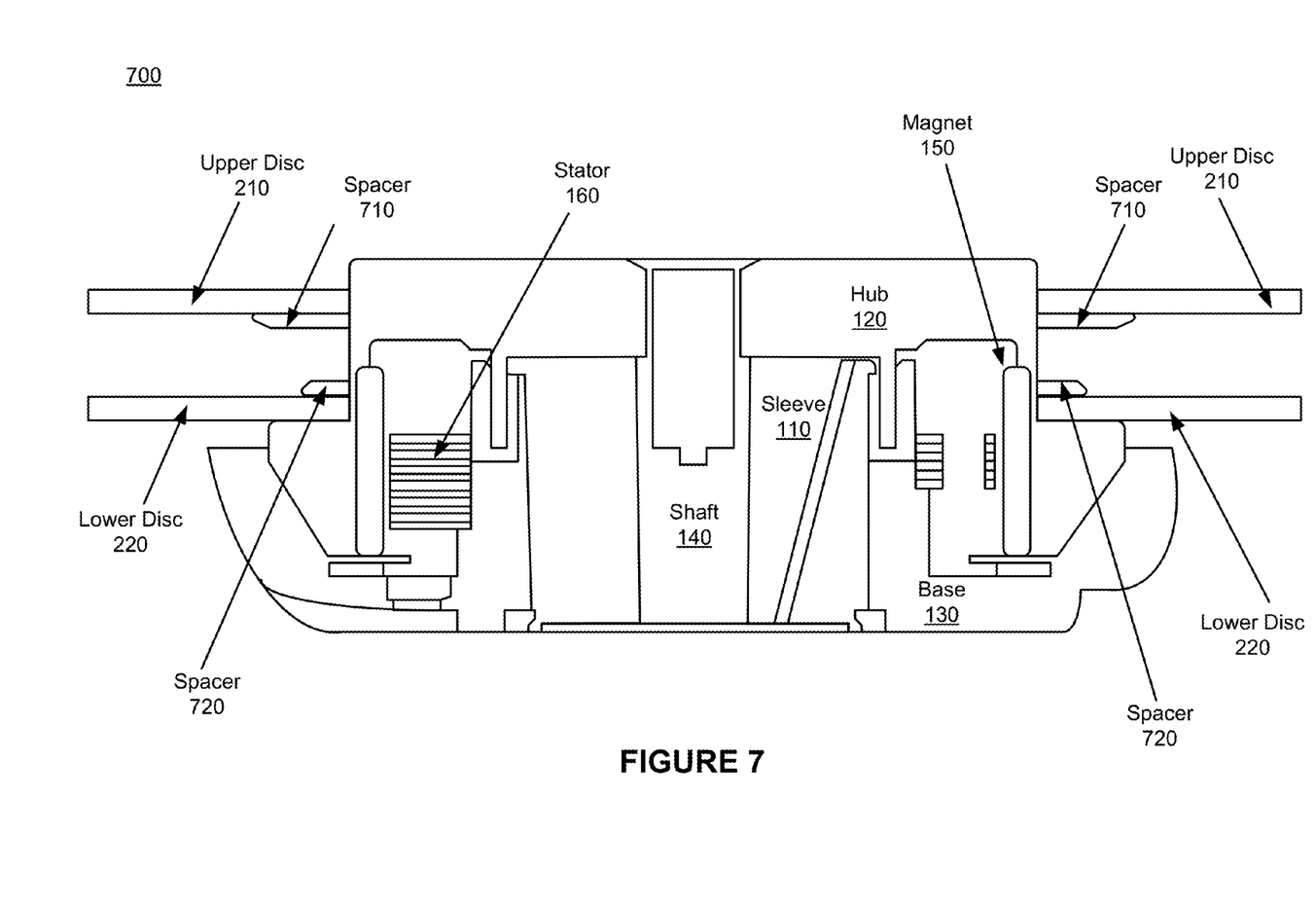
FIG. 7 shows a cross sectional view of a fluid dynamic motor with two spacer rings in accordance with one embodiment.

Referring now to FIG. 7, a cross sectional view of a fluid dynamic motor with two spacer rings in accordance with one embodiment is shown. The fluid dynamic motor 700 according to one embodiment includes an upper spacer ring 710 and a lower spacer ring 720. The upper spacer ring 710 is coupled to the upper disk 210 and is further coupled to the hub 120. The lower spacer ring 720 is coupled to the lower disk 220 and is further coupled to the hub 120. It is appreciated that the upper spacer ring 710 contacts the upper disk 210 at a different location in comparison to the lower spacer ring 720 and that the two spacer rings are separated from one another.

Having two spacer rings 710 and 720 contacting their respective disks in different locations cause the upper disk 210 and the lower disk 220 to deflect independently and not in unison. Accordingly, energy from tilting and/or axial motions are transferred to the motor's fluid dynamic bearing because the tilting and/or axial motions by the upper 210 and lower disks 220 do not cancel each other.

Accordingly, having an upper spacer ring 710 and a lower spacer ring 720 contacting their respective disks in different locations change the boundary conditions of the upper disk 210 and the lower disk 220. As such, the natural frequencies of the upper 210 and lower disk 220 are shifted apart and the disks vibrate out of phase. As such, tilting and/or axial motions of the upper disk 210 and the lower disk 220, whether due to windage or not, do not occur in unison. In other words, having two spacer rings shaped such that the outer edge of the upper spacer ring 710 contacts the upper disk 210 at a different location in comparison to the point of contact between the lower spacer ring 720 and lower disk 220 effectively changes the diameter of the upper 210 and the lower disk 220, thereby reducing their tendency to move in opposite directions in unison.

Figure 8:
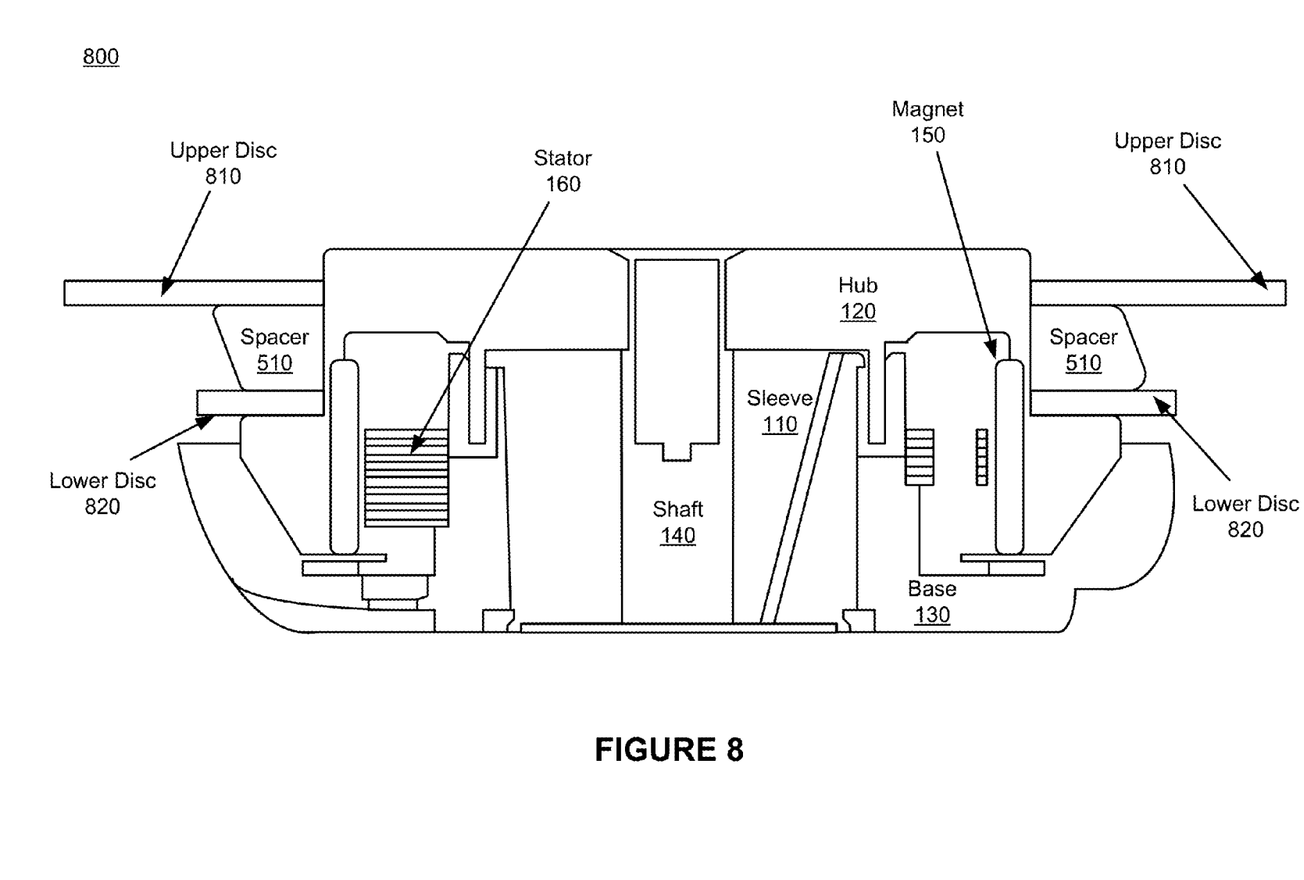
FIG. 8 shows a cross sectional view of a fluid dynamic motor with different disk diameters in accordance with one embodiment.

Referring now to FIG. 8, a cross sectional view of a fluid dynamic motor with different disk diameters in accordance with one embodiment. In this embodiment, the fluid dynamic motor 800 includes an upper disk 810 that has a different diameter than the lower disk 820. Furthermore, the fluid dynamic motor 800 may include one or more spacers in accordance with one of the embodiments described above. For example, in this embodiment, the fluid dynamic motor 800 includes a lobed spacer 510. But it is appreciated that the spacer ring may be according to any of the spacers described above, e.g., tapered spacer, different spacer chamfers, etc.

Different diameters for the upper disk 810 and the lower disk 820 cause the upper disk 810 and the lower disk 820 to deflect independently and not in unison. Moreover, having a ring spacer that contacts the upper disk 810 and the lower disk 820 at different locations may further help the disks deflect independently and not in unison. Accordingly, energy from tilting and/or axial motions are transferred to the motor's fluid dynamic bearing because the tilting and/or axial motions by the upper 810 and lower disks 820 do not cancel each other.

In other words, the differently sized disks change the boundary conditions of the upper disk 810 and the lower disk 820, thereby shifting the natural frequencies of the upper 810 and lower disk 820 apart such that they vibrate out of phase. As such, tilting and/or axial motions of the upper disk 810 and the lower disk 820, whether due to windage or not, do not occur in unison. Further, addition of a spacer ring contacting the upper disk 810 at a different location in comparison to the lower disk 820 further changes the effective diameter of the upper 810 and the lower disk 820, thereby reducing their tendency to move in opposite directions in unison.

Figure 9:
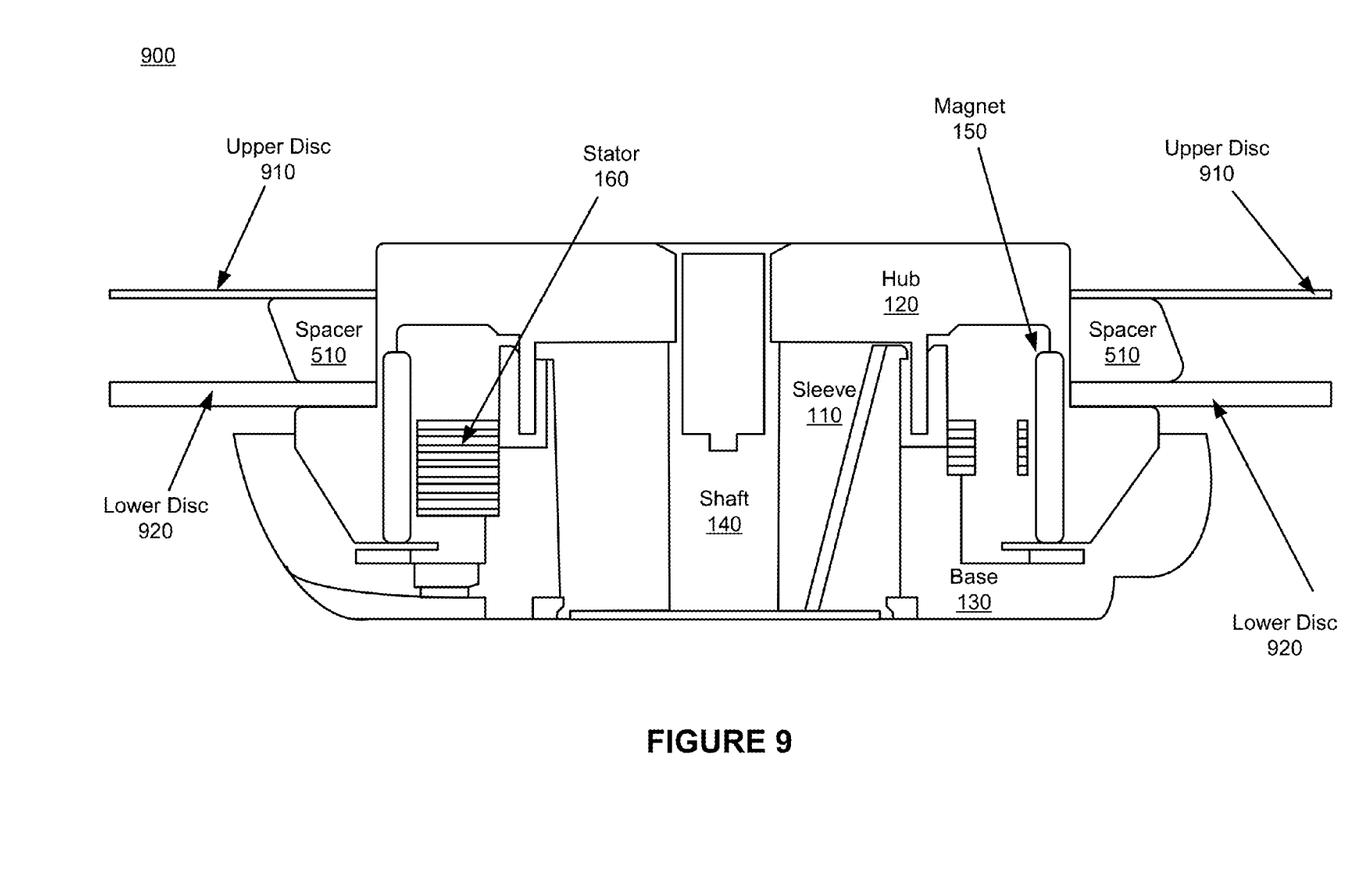
FIG. 9 shows a cross sectional view of another fluid dynamic motor with different disk thickness in accordance with one embodiment.

Referring now to FIG. 9, a cross sectional view of a fluid dynamic motor with different disk thickness in accordance with one embodiment is shown. The fluid dynamic motor 900 includes an upper disk 910 and a lower disk 920 that have different thicknesses. For example, the upper disk 910 is thinner in comparison to the lower disk 920. Different thickness for the disks causes the natural frequencies of the upper disk 910 to separate from the lower disk 920, which causes them to deflect independent from one another and not to move in unison. As such, the disks couple through the fluid dynamic bearing that dampens the motion in axial and/or tilting directions. It is appreciated that a spacer ring making contact with the upper disk 910 and the lower disk 920 at different locations may further exacerbate independent movements of the upper and the lower disks. It is appreciated that the spacer ring may be in accordance with any of the embodiments described above (in this example, the spacer ring is lobed). Accordingly, energy from tilting and/or axial motions are transferred to the motor's fluid dynamic bearing because the tilting and/or axial motions by the upper 910 and lower disks 920 do not cancel each other.

Figure 10:
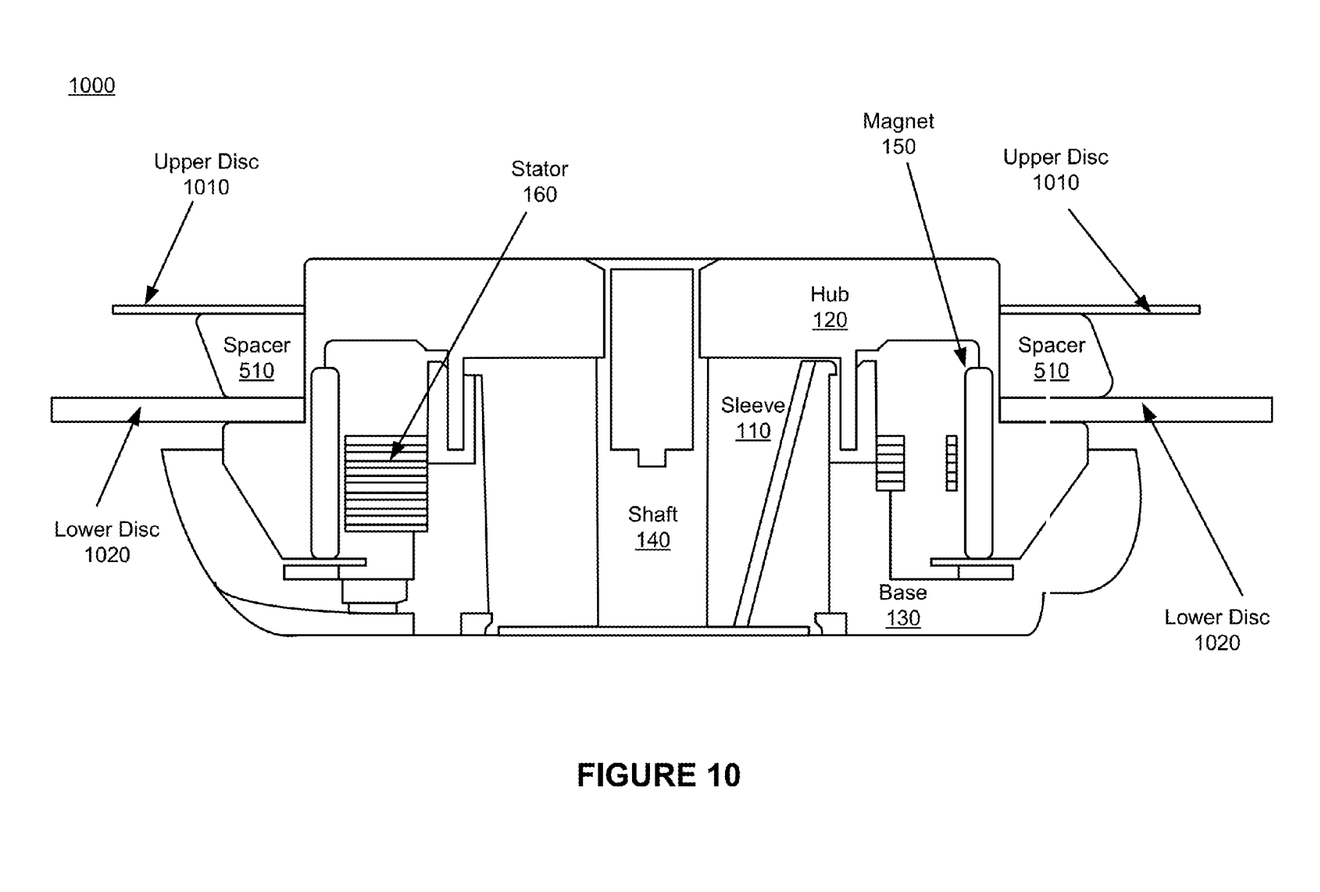
FIG. 10 shows a fluid dynamic motor with upper and the lower disks with different diameters and different thicknesses in accordance with one embodiment.

It is further appreciated that independent movements of the upper 1010 and the lower disk 1020 may further be exacerbated by having the upper and the lower disks with different diameters, as shown in FIG. 10. As shown by the fluid dynamic bearing 1000, the upper disk 1010 has a different diameter in comparison to the lower disk 1020. In this embodiment, the lower disk 1020 has a thickness that is greater than the thickness of the upper disk 1010. However, it is appreciated that their respective thicknesses may be the same and having different thicknesses is merely exemplary and not intended to limit the scope of the present invention. Moreover, it is appreciated that the ring spacer may be in accordance with any of the embodiments described above (in this example, the spacer ring is lobed). However, it is appreciated that other embodiments may not require a ring spacer since the diameter of the upper and the lower disks are different. Accordingly, energy from tilting and/or axial motions are transferred to the motor's fluid dynamic bearing because the tilting and/or axial motions by the upper 1010 and lower disks 1020 do not cancel each other.

It is appreciated that different materials may be used to vary the density and the elasticity of each disk to ensure that the disks do not move in unison. For example, different types of glass, polycarbonate plastic, aluminum, protective acrylic coating, etc., may be used for the upper disk than from the lower disk. The embodiments described above may be combined in any fashion, as desired. For example, any combination of the ring spacers (described above), with different diameters for the disks, with different thicknesses for different disks, different material for the disks, etc., may be used to ensure that the disks do not move in unison and to ensure transfer of energy to the fluid dynamic bearing.

Figure 11A:
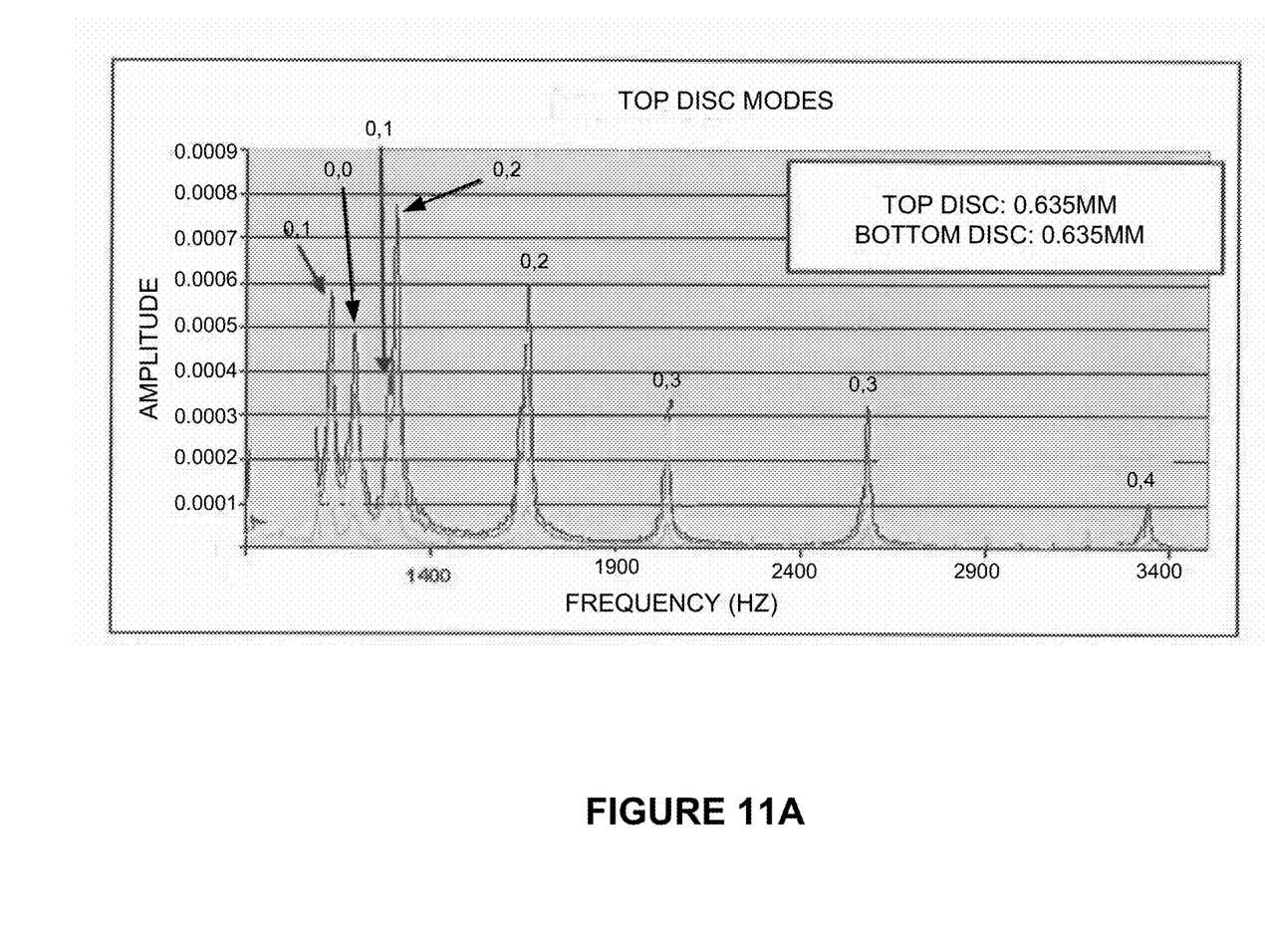
FIGS. 11A and 11B show vibration measurement of the top and the bottom disks in accordance with one embodiment.
Figure 11B:
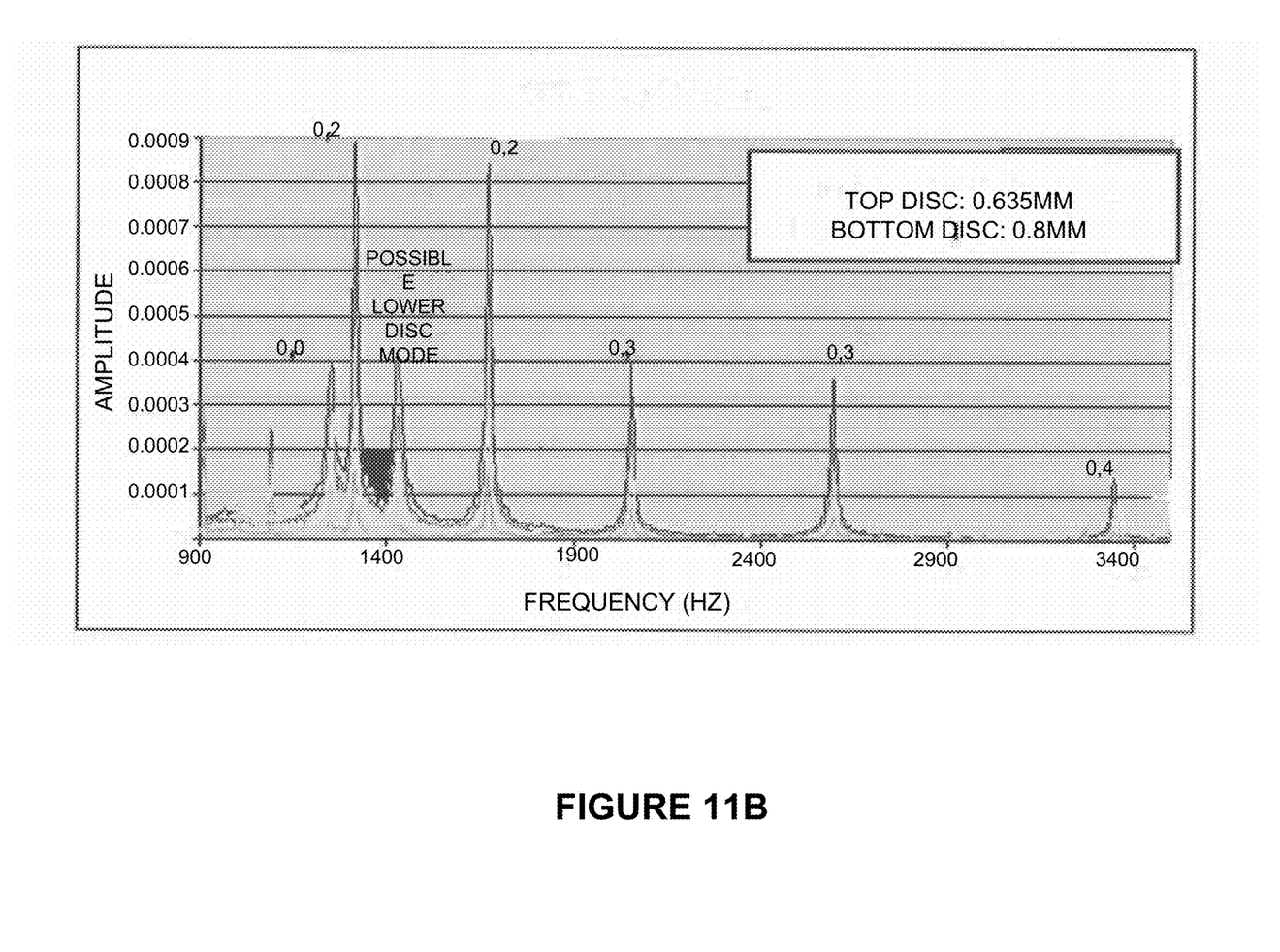

Referring now to FIGS. 11A and 11B, a comparison of the vibration measurement between a system without spacers and an exemplary embodiment of the present invention is shown. FIG. 11A illustrates vibration measurement when the top and the bottom disks have the same thickness. As can be seen, high vibrations are measured for the tilting and the umbrella modes illustrated by 0,0 and 0,1 mode for frequencies over a 1000 Hz. However, lower vibration measurements are registered for tilting and the umbrella modes for the top and the bottom disks having different thicknesses, as shown by FIG. 11B. In other words, a fluid dynamic motor in accordance with embodiments herein transfer the tilting and/or axial motions of the disks to the fluid dynamic bearing, thereby dampening the motions. As such, the disk density may be increased.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

What is claimed is:

1. An apparatus comprising:
 a first disk mounted to a hub, wherein said first disk has a first dynamic resonance mode associated therewith, and wherein said first disk has a first set of characteristics associated therewith;
 a second disk mounted to said hub, wherein said second disk has a second dynamic resonance mode associated therewith, wherein said second disk has a second set of characteristics associated therewith, and wherein at least one characteristic of said first set of characteristics and said second set of characteristics is different causing said first dynamic resonance mode to be different from said second dynamic resonance mode;
 a first spacer positioned between said first disk and said second disk; and
 a second spacer positioned between said first disk and said second disk, wherein said first spacer and said second spacer are separated.

2. The apparatus of claim 1, wherein said at least one characteristic is respective thicknesses of said first disk and said second disk.

3. The apparatus of claim 1, wherein said at least one characteristic is respective disk vibration amplitudes of said first disk and said second disk, and wherein further said vibration amplitude of said first disk is of a different phase than said vibration amplitude of said second disk.

4. The apparatus of claim 1, wherein said at least one characteristic is respective disk materials of said first and said second disks.

5. The apparatus of claim 1, wherein said at least one characteristic is respective diameter of said first disk and said second disk.

6. The apparatus of claim 1, wherein said at least one characteristic is respective densities of said first disk and said second disk.

7. The apparatus of claim 1, wherein said at least one characteristic is respective elastic modulus of said first disk and said second disk.

\* \* \* \* \*